June 20, 1933.　　　W. D. BURTON　　　1,914,486
MECHANICAL STOKER
Filed Sept. 7, 1929
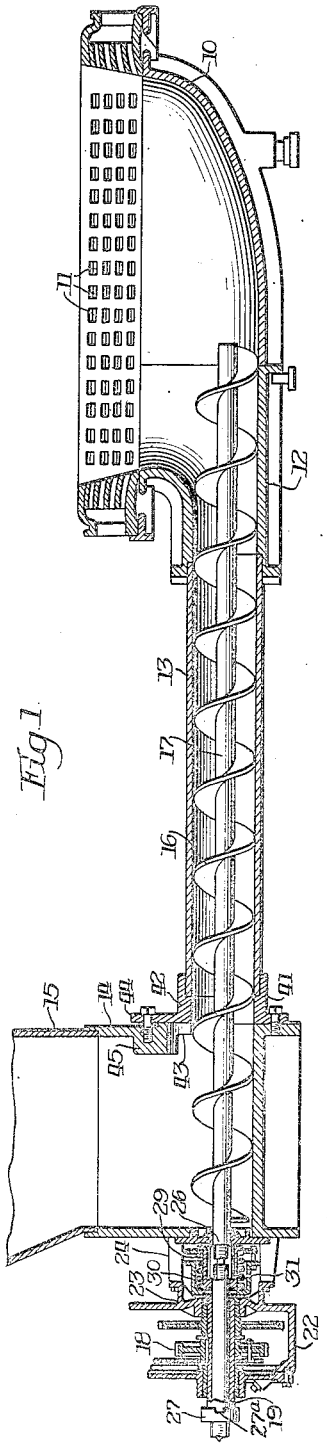
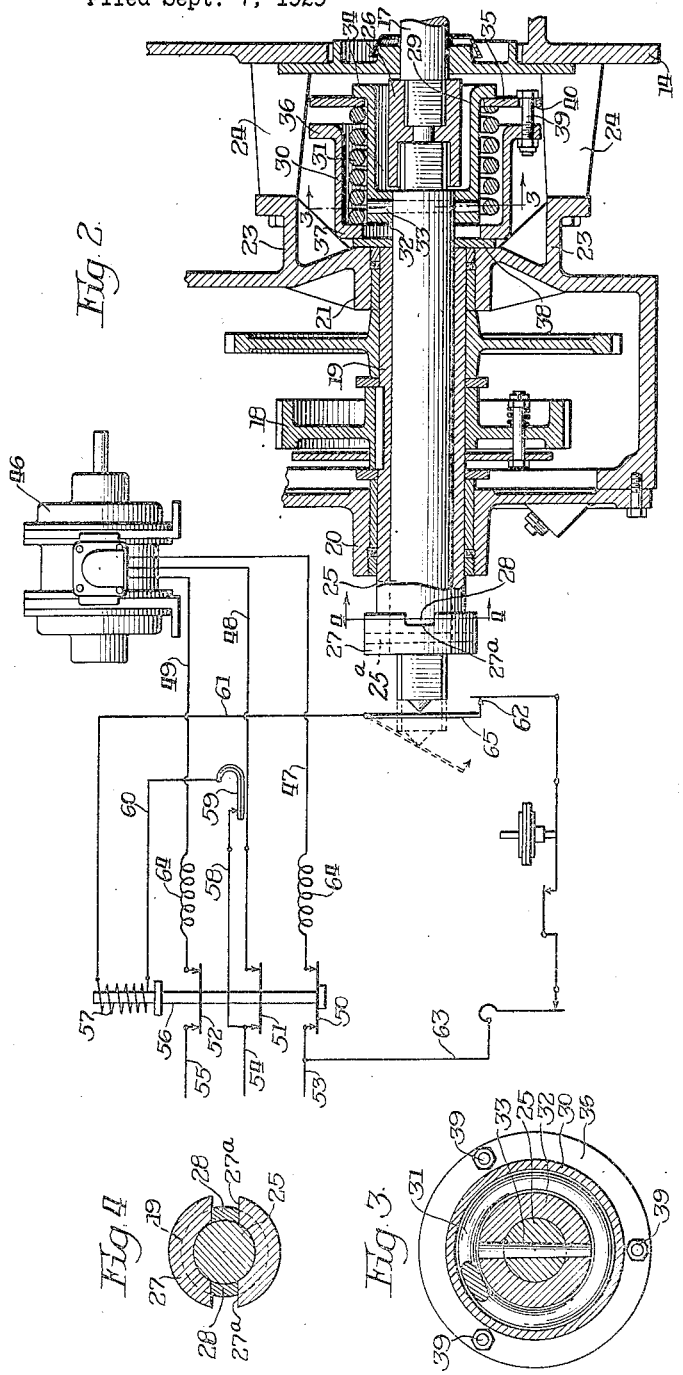
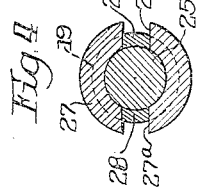
Inventor
Warren Dean Burton
By Chindell Parker Carlson
Attys Patented June 20, 1933

1,914,486

UNITED STATES PATENT OFFICE

WARREN DEAN BURTON, OF OAK PARK, ILLINOIS, ASSIGNOR TO COMBUSTIONEER, INC., OF CICERO, ILLINOIS, A CORPORATION OF ILLINOIS

MECHANICAL STOKER

Application filed September 7, 1929. Serial No. 390,876.

The present invention relates to improvements in mechanical stokers, and is particularly applicable to stokers of the underfeed type.

In one form of underfeed stokers, coal is fed by a power driven screw conveyor from a hopper through a conveyor casing or duct into the bottom of a retort where it is consumed. The coal supplied to the hopper often contains foreign objects, such as pieces of iron, steel or rock, which will not crush. Frequently, these objects form obstructions at the outlet of the hopper, thereby clogging the apparatus. In this event, if the drive for the screw conveyor is not disconnected, serious damage to the apparatus may result. To avoid the possibility of such damage, it is common to interpose a member in the drive for the screw conveyor which will shear when subjected to a force somewhat in excess of the force required in normal operation, and which can be readily replaced.

If an obstruction in the hopper causes a break down in the operation, obviously, the obstruction must be removed and a new shear member must be provided before the operation can be started again. This involves inconvenience and often a considerable loss of time.

The primary object of the present invention therefore resides in the provision of a novel safety cut-out mechanism which will automatically disengage the power drive for the conveyor if an obstruction causes a force substantially in excess of the normal force to be applied to the conveyor.

In operation, the conveyor is subjected to end thrust. An important object of the invention resides in the provision of a new and improved safety cut-out mechanism which comprises means adapted to resist the normal end thrust but to permit endwise movement of the conveyor in instances of excessive end thrust, and means operable upon such endwise movement of the conveyor to disengage the power drive for the conveyor until the excessive thrust has been relieved.

A more specific object resides in the provision in combination with a safety cut-out mechanism of the foregoing character of a removable closure in the hopper adjacent the conveyor outlet for permitting obstructions to be readily and quickly removed without removing all of the coal from the hopper.

Further objects and advantages will become apparent as the description proceeds.

In the accompanying drawing, Figure 1 is a vertical, longitudinal sectional view of a stoker embodying the features of my invention.

Fig. 2 is an enlarged fragmentary sectional view of the drive and safety cut-out mechanism for the conveyor.

Fig. 3 is a transverse sectional view taken along line 3—3 of Fig. 2.

Fig. 4 is a sectional view of the clutch taken along line 4—4 of Fig. 2.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications falling within the spirit and scope of the invention as expressed in the appended claims.

Referring more specifically to the drawing, the exemplary embodiment of the invention comprises an upwardly opening retort 10 of standard construction having tuyere openings 11 about the upper edge and having an inlet duct 12 at the bottom. The inlet duct 12 is connected through a conveyor duct or casing 13 preferably cylindrical in form, to the base 14 of a container or hopper 15 into which coal is supplied. Extending through the base 14 and the casing 13 into the retort 10 for conveying coal from the hopper 15 into the bottom of the retort is a suitable conveyor screw 16 having a longitudinal shaft 17.

The end of the shaft 17 extends out of the hopper base 14 for connection to a suitable power drive. In the present instance, this power drive comprises a gear 18 adapted to be connected to a suitable source of power and keyed to a sleeve 19 journaled in bearings 20 and 21 in opposite side walls of a housing 22. The latter is rigidly secured in spaced relation to the hopper base 14, and to this end is formed with lugs 23 bolted to a plurality of spacing arms 24 projecting from the base. Slidably and rotatably disposed in the sleeve 19 is a shaft 25. The inner end of the shaft 25 is suitably connected to the shaft 17, as by a coupling 26. Keyed to the outer end of the shaft 25 by means of a pin 25ª is a collar 27 having diametrically opposed notches or recesses 27ª which are adapted to receive two diametrically opposed tongues 28 formed in the outer end of the sleeve 19. The collar 27 and the tongues 28 constitute a clutch for operatively connecting the sleeve 19 to the shaft 25.

Means is provided for yieldingly holding tongues 28 in the recesses 27ª to complete the drive connection for the conveyor 16. Preferably, this means is a spring unit acting on the shaft 25, and tending to move or hold the latter together with the conveyor 16 to the right opposite to the normal direction of thrust. The spring unit comprises inner and outer spaced concentric sleeves 29 and 30 and a coil spring 31 disposed between the sleeves. The inner sleeve 29 is provided on one end with a hub 32 embracing the inner end of the shaft 25 outside of the housing 22, and rigidly secured thereto by means of a suitable taper pin 33. The other end of the sleeve 29 adjacent the hopper base 14 is turned out to form a peripheral flange 34 constituting a backing for a disk 35 on the sleeve against which one end of the spring 31 impinges. Of the outer sleeve 30, the end adjacent the disk 35 is turned out to form a peripheral flange 36 normally spaced from the disk 35 to permit relative movement thereof axially of the shaft 17, and the other end is turned inwardly to form a peripheral flange 37 against which the adjacent end of the spring 31 impinges. The flange 37 bears against a wearing plate 38 on the housing 22 and about the shaft 25.

Secured to the flange 36 are a plurality of spaced bolts 39 which project freely through openings 40 in the disk 35, and the heads of which normally engage the disk to limit the extent of separation between the flange and the disk. The spring 31 tends to urge the conveyor 16 to the right only when the disk 35 and the flange 36 are not separated to the fullest permissible extent. The self-contained spring unit thus takes up the reaction of the spring except when the end thrust on the conveyor exceeds the spring pressure.

The spring is of such strength that under compression it exerts a pressure sufficient to withstand the end thrust of the conveyor when the latter is operating under the most severe normal conditions. In the event of an obstruction in the hopper base 14, the end thrust on the conveyor 16 is greatly increased, and tends to move the latter endwise against the action of the spring 31. If the end thrust exceeds a predetermined amount, the notches 27ª will be moved out of engagement with the tongues 28, thereby breaking the power drive for the conveyor and causing the latter to stop. When the end thrust is relieved, the spring 31 automatically reestablishes the power drive. Thus, the pin 25ª is not sheared and need not be replaced each time the operation is discontinued because of excessive load on the conveyor.

While the gear 18 may be driven by any suitable means, in the present instance it is connected through means (not shown) to an electric motor 46. An important feature of the present invention resides in the provision of means for rendering the motor 46 inoperative when the shaft 25 moves endwise against the action of the spring 31, or when the conveyor 17 is subjected to an excessive torque. To this end, the motor 46 is connected through three wires 47, 48 and 49 connected in turn through switches 50, 51 and 52 to the main current terminals 53, 54 and 55. The switches 50, 51 and 52 are mounted on a rod 56, the upper end of which is adapted to constitute the core of a solenoid 57. The switches open simultaneously under the influence of gravity when the solenoid 57 is deenergized, and close simultaneously when the solenoid is energized.

The solenoid 57 is controlled by a control circuit leading from the terminal 54 through a wire 58, a thermostatic switch 59, a wire 60, the coil 57, a wire 61, a switch 62, and a wire 63 to the terminal 53. Interposed in each of the wires 47 and 49 is a heating element 64 which is positioned next to the switch 59 and is adapted to cause the latter to open when the load becomes excessive. The switch 62 comprises an arm 65 depending across the end of the shaft 25 and adapted to be opened when the latter moves to the left.

Means is provided for facilitating the removal of obstructions in the base 14 tending to interfere with the operation of the conveyor screw, without necessitating the removal of all of the coal from the hopper 15. To this end, the hopper is formed with one or more openings giving access to the interior of the base 14 adjacent the outlet to the conveyor casing 13. In normal operation, these openings are sealed by removable closures. The construction for permitting the ready removal of obstructions may assume various forms.

In the preferred form shown in Fig. 1, the casing 13 is secured to the hopper base 14 by means of a semi-cylindrical bracket 41 bolted to the base and welded to the underside of the casing, and an upper semi-cylindrical bracket 42 embracing the top of the casing and removably secured, as by means of bolts, to the adjacent wall of the hopper base and the bottom bracket 41. Formed in the wall of the hopper base 14 directly over the outlet to the casing 13 is a suitable opening 43 for permitting the removal of material. This opening normally is closed by an upstanding plate 44 formed integral with the upper bracket 42. Formed adjacent the upper margin of the opening 43 on the inside of the base wall is an inwardly extending deflector 45 preferably in the form of a flange. This deflector tends to prevent coal from the hopper from passing directly to the entrance of the conveyor casing 13.

In operation, if an obstruction causes the conveyor 16 to move endwise, the switch 62 will open, thereby causing the motor to stop. If the obstruction applies an excessive torque on the conveyor 16 but does not move the latter endwise, the overload switch will cause the motor to stop. In either event, by removal of the plate 44, the obstruction can be readily removed and the stoker can be quickly replaced in operation.

I claim as my invention:—

1. A stoker comprising, in combination, a container, a rotary screw conveyor extending into said container, said conveyor being axially movable, means for rotating said conveyor, an electric motor for driving said means, a control circuit for said motor, said control circuit including a switch adapted to be opened or closed upon movement of said conveyor axially in opposite directions, and yielding means acting on said conveyor in a direction to close said switch.

2. A stoker comprising, in combination, a container, a rotary screw conveyor extending into said container, means for rotating said conveyor, an electric motor for driving said means, control circuits for said motor, said circuits including a control switch for said circuits operable to open or close upon endwise movement of said conveyor in opposite directions, an overload release for said conveyor operable to disconnect or reestablish the drive to said conveyor upon movement of said conveyor respectively in said opposite directions, and means tending to maintain said conveyor in position to maintain said switch closed and said release in operative position.

3. A stoker comprising, in combination, a container having a discharge outlet, a rotary screw conveyor in said container for feeding fuel to said outlet, said conveyor having a limited axial movement, means tending to hold said conveyor in fixed endwise position against axial thrust, means including an electric motor for driving said conveyor, a control circuit for said motor, a switch in said control circuit, said switch having an element operatively related to said conveyor so as to open said switch upon endwise movement against the action of said first-mentioned means, the relationship of parts being such that said conveyor may have initial endwise play without opening said switch.

4. A stoker comprising, in combination, a container having a discharge outlet, a rotary screw conveyor in said container for feeding fuel to said outlet, said conveyor having a limited axial movement, means tending to hold said conveyor in fixed endwise position against axial thrust, means for driving said conveyor, said means including a clutch adapted to be opened and closed automatically upon endwise movement of said conveyor in opposite directions and including an electric motor, and a control circuit for said motor, said circuit including a switch adapted to be opened automatically upon opening of said clutch.

5. A stoker comprising, in combination, a container having a discharge outlet, a rotary screw conveyor in said container for feeding fuel to said outlet, said conveyor being arranged for limited axial movement by the imposition of an excess load thereon, a motor drivingly connected with said conveyor, and control circuits for said motor including a switch movable to opened or closed position upon axial movement of said conveyor in one direction or the other, and a thermostatically actuated switch operable by heat created in the circuit when an excess load is imposed on the conveyor without moving the conveyor axially to open the first-mentioned switch.

6. A stoker comprising, in combination, a container, a rotary screw conveyor extending into said container, an electric drive motor, a power transmission connecting said motor to said conveyor, said transmission including two relatively movable members in operative driving engagement, spring means tending to move said members relatively to each other in one direction, the application of an excessive load to said conveyor tending to cause said members to move automatically relatively to each other in the reverse direction against the action of said spring means, and a control circuit for said motor, said control circuit including a switch adapted to be opened automatically as an incident to relative movement of said members in said reverse direction.

7. A stoker comprising, in combination, a container, a rotary screw conveyor extending into said container, an electric drive motor, a power transmission connecting said motor to said conveyor, said transmission including a shaft and a sleeve connected for joint rotation and being relatively axially movable, spring means tending to move said shaft and said sleeve relatively axially in one direction, the application of an excessive load on said conveyor tending to move said shaft and said sleeve relatively axially in the other direction against the action of said spring means, and a control circuit for said motor, said control circuit including a switch adapted to be opened automatically as an incident to the relative axial movement of said shaft and said sleeve in said other direction.

8. An underfeed stoker comprising, in combination, a vertical fuel container, a discharge duct opening generally horizontally from the lower end thereof, a rotary screw conveyor extending from said container into said duct, said container having an opening adjacent its juncture with said duct, a removable closure for said opening, an electric motor having a driving connection with said conveyor, control circuits for said motor, said control circuits including an electric overload release adapted to interrupt the operation of said motor when an excessive load is imposed on the conveyor, said opening affording convenient access to the interior of said conveyor for the removal of foreign obstructions that may lodge between said conveyor and said closure and resist the operation of said conveyor to cause the operation of said overload release.

9. An underfeed stoker comprising, in combination, a vertical fuel container, a discharge duct opening generally horizontally from the lower end thereof, a rotary screw conveyor extending from said container into said duct, said container having an opening adjacent its juncture with said duct, a removable closure for said opening, an electric motor having a driving connection with said conveyor, said connection including a spring-seated clutch adapted to open automatically upon the application of an excessive load to said conveyor, and electric control circuits for said motor, said circuits including an electric overload release adapted to interrupt the operation of said motor when the load imposed on said conveyor subjects said motor to an excessive load, said opening affording convenient access to the interior of said conveyor for the removal of foreign obstructions that may lodge between said conveyor and said closure and resist the operation of said conveyor to cause the operation of said overload release.

10. An underfeed stoker comprising, in combination, a vertical fuel container, a discharge duct opening generally horizontally from the lower end thereof, a rotary screw conveyor extending from said container into said duct, said container having an opening adjacent its juncture with said duct, a removable closure for said opening, an electric motor having a driving connection with said conveyor, and control circuits for said motor, said control circuits including a switch adapted to open automatically upon the application of an excessive mechanical load to said conveyor and an overload release switch adapted to interrupt the operation of said motor when the load imposed on the conveyor subjects said motor to an excessive load, said opening affording convenient access to the interior of said conveyor for the removal of foreign obstructions that may lodge between said conveyor and said closure and resist the operation of said conveyor to cause the operation of said overload release.

In testimony whereof, I have hereunto affixed my signature.

WARREN DEAN BURTON.